United States Patent
Davies

(10) Patent No.: US 8,708,627 B2
(45) Date of Patent: Apr. 29, 2014

(54) WHEEL LUG NUT LOCKING DEVICE

(76) Inventor: Ifor C. Davies, Oakville (CA)

( * ) Notice: Subject to any disclaimer, the term of this patent is extended or adjusted under 35 U.S.C. 154(b) by 109 days.

(21) Appl. No.: 13/003,370

(22) PCT Filed: Jul. 10, 2009

(86) PCT No.: PCT/CA2009/000969
§ 371 (c)(1),
(2), (4) Date: Jan. 10, 2011

(87) PCT Pub. No.: WO2010/003250
PCT Pub. Date: Jan. 14, 2010

(65) Prior Publication Data
US 2011/0129318 A1 Jun. 2, 2011

Related U.S. Application Data

(60) Provisional application No. 61/079,591, filed on Jul. 10, 2008.

(51) Int. Cl.
*F16B 39/02* (2006.01)

(52) U.S. Cl.
USPC .............................. 411/102; 411/89; 411/97

(58) Field of Classification Search
USPC ........... 411/84–90, 92, 95, 97, 101, 111, 117, 411/119, 121, 102, 8, 10, 11, 14, 98
See application file for complete search history.

(56) References Cited

U.S. PATENT DOCUMENTS

| | | | |
|---|---|---|---|
| 510,501 A * | 12/1893 | Doane | 411/94 |
| 2,469,441 A | 3/1945 | Pitisci | |
| 2,758,628 A | 8/1956 | Rice | |
| 3,222,976 A | 12/1965 | Holman | |
| 4,267,870 A | 5/1981 | Warner | |
| 4,370,083 A * | 1/1983 | Burnett et al. | 411/87 |
| 4,657,457 A * | 4/1987 | Rickwood | 411/93 |
| 4,709,654 A | 12/1987 | Smith | |
| 4,737,057 A | 4/1988 | Olsson | |
| 5,096,263 A | 3/1992 | Wright | |
| 5,120,174 A | 6/1992 | Patti | |
| 5,503,465 A | 4/1996 | Price | |
| 5,959,365 A | 9/1999 | Mantini et al. | |

(Continued)

FOREIGN PATENT DOCUMENTS

| EP | 0084764 A | 8/1983 |
|---|---|---|
| EP | 1169183 | 9/2003 |

(Continued)

*Primary Examiner* — Gary Estremsky
(74) *Attorney, Agent, or Firm* — Gerald A. Gowan; Gowan Intellectual Property

(57) ABSTRACT

A wheel lug nut locking device having first and second planar sections, each with an opening adapted to be fitted around a wheel lug nut. The planar sections are connected by a flexible section that allows the planar sections to be moved relative to one another. In a preferred embodiment, the flexible section has a concertina-like structure. In use, the locking device is used to lock a wheel lug nut to an adjacent wheel lug nut, so as to prevent or reduce rotation of the wheel lug nut. A plurality of locking devices can be fitted to a single wheel so that all of the lug nuts are operatively locked to an adjacent lug nut. The resulting locking system can be rapidly installed on each lug nut on all wheels, so as to provide improved safety aspects.

15 Claims, 3 Drawing Sheets

(56) References Cited

U.S. PATENT DOCUMENTS

| | | |
|---|---|---|
| 6,053,681 A | 4/2000 | Mattershead |
| 6,158,933 A | 12/2000 | Nicholson |
| 6,398,312 B1 | 6/2002 | Marczynski et al. |
| 6,409,224 B1 * | 6/2002 | Schmidt et al. ............ 285/124.3 |
| 6,450,746 B1 * | 9/2002 | Kirimoto ........................ 411/95 |
| 6,533,514 B2 | 3/2003 | Fischer |
| 6,561,124 B1 | 5/2003 | Marczynski et al. |
| 7,012,511 B2 | 3/2006 | Hayes |
| 7,731,463 B2 * | 6/2010 | Davis ............................ 411/119 |
| 7,927,049 B2 | 4/2011 | Adams |
| 8,337,129 B2 | 12/2012 | Boyce |
| 2001/0016154 A1 | 8/2001 | Laakkonen |
| 2004/0181924 A1 | 9/2004 | Saunders, II |
| 2005/0083186 A1 | 4/2005 | Hayes |

FOREIGN PATENT DOCUMENTS

| | | |
|---|---|---|
| GB | 2229241 | 9/1990 |
| GB | 2242720 | 10/1991 |
| GB | 2283551 | 5/1995 |
| GB | 2406365 A | 3/2005 |

* cited by examiner

WHEEL LUG NUT LOCKING DEVICE

CROSS REFERENCE TO RELATED APPLICATIONS

This application is derived from PCT application No. PCT/CA2009/000969, filed Jul. 10, 2009, which claimed priority to U.S. Provisional Patent Application No. 61/079,591, filed Jul. 10, 2008, the entire contents of which documents are expressly incorporated herein by reference.

FIELD OF THE INVENTION

The present invention relates to the field of wheel lugs, and in particular, relates to a safety device that is used to lock the wheel lug nuts in place and/or indicate rotational movement of the wheel lug nut.

BACKGROUND OF THE INVENTION

In large vehicles and especially a tractor-trailer, it is possible for loosening wheels, and other problems to go unnoticed. Detection of loosening wheels, and loosening lug nuts, is difficult to observe even when the trailer is stationary. When in motion, the problem is exacerbated by the distance between the operator and the wheels of the vehicle so that detection of a loosening wheel is not readily observed.

Moreover, most tractor-trailers typically include four wheels mounted to each axle, and two wheels attached to each of the two wheel hub assembly at the end of each axle. This configuration causes additional difficulty in detecting loosening wheel problems.

A particularly significant issue relates to the inadvertent loosening of the wheel lugs nuts which are used to hold the wheel hub in place. This can be as a result of, for example, improper tightening but can also be caused by other causes, such as vibration in the tire/wheel assembly, temperature changes, or the like. Also, contaminants lodged between the lug, the wheel hub surface, and the like, can prevent proper seating of the wheel which can lead to loosening of the lug nut when the contaminant breaks free. As such, there are a variety of reasons why a wheel lug nut will loosen over time. However, even with visual inspections when the trailer is stopped, the initial stages of a loosening wheel lug nut are difficult to observe.

Loosening of one wheel lug nut typically leads to loosening of adjacent lug nuts, and this effect can cause all of the wheel lug nuts to become loosened. Typically, the vehicle operator often has little or no warning of a failure, which in a worse case scenario, can result in the wheel becoming completely free of the vehicle.

Various devices are used to provide feedback to the vehicle operator that a wheel lug nut is loosening. These include plastic disks having an arrow shape which are fitted over the lug nut. Any movement of the lug nut will cause the arrow direction to change. While this is useful for visually checking the lug nut, it does not provide any mechanism to check or abate movement of the lug nut, and thus, the wheel can still become free.

Other devices providing an interlocking ring of plastic clips that can be positioned around the lug nuts, so as to lock the lug nuts in place. When the trailer is stationary, the plastic clips can be checked to determine whether they have moved with respect to each other. During use, the interlocking feature assists in preventing rotational movement of the lug nuts.

However, this approach requires that a covering/attachment be fitted to each lug nut and then interlocked with each adjacent lug nut assemblies. This can take an excessive amount of time. Further, fitting of the last assembly to the last lug nut can be difficult, and thus, forming the interlocking ring can prove to be difficult.

To overcome these difficulties, it would be advantageous to provide a wheel lug nut locking device that aids in showing any rotational movement of a wheel lug nut, and which also provides assistance in preventing or lessening any chance of the lug nut rotating.

SUMMARY OF THE INVENTION

Accordingly, it is a principal advantage of the present invention to provide a wheel lug nut locking device which provides an indication of rotational movement of the wheel lug nut.

It is a further advantage of the present invention to provide a wheel lug nut locking device which reduces, and aids in resisting any rotational movement of the wheel lug nut.

It is a still further advantage of the present invention, to provide such a wheel lug nut locking device which is low cost, easily used, and easily checked by the driver, operator, or the like.

The advantages set out hereinabove, as well as other objects and goals inherent thereto, are at least partially or fully provided by the wheel lug nut locking device of the present invention, as set out herein below.

Accordingly, in one aspect, the present invention provides a wheel lug nut locking device comprising a substantially flat member having a first planar section at one end of the member, and a second planar section at an opposite end of the member, wherein each of said first and second planar sections has a opening adapted to be friction fitted around a wheel lug nut, and wherein, said first and second planar sections are separated by a flexible, resilient connection section which allows relative movement of the first and second planar sections within the plane of the flat member.

Preferably, the flexible, resilient connection section is provided by a section have a concertina-like shape that allows the connection section to be compressed or expanded within the plane of the flat member.

Preferably, the locking device will have two openings adapted to be fitted around two adjacent wheel lug nuts. However, a plurality of openings can be provided in series, that can be fitted around three or more lug nuts. While in an extreme example, a single locking device be fitted in series around all lug nuts in a wheel assembly, preferably, the number of openings is less than 6, and more preferably less than 4. Most preferably, however, the number of lug nut openings is two so that each wheel lug nut is operatively connected to only one adjacent wheel lug nut.

Also, preferably, each lug nut on the wheel is fitted with a locking device of the present invention. For example, in a ten lug nut wheel, 5 two-opening locking devices would be used so that each wheel lug nut is connected to a locking device, and operatively connected to one adjacent wheel lug nut.

The locking device can be made of any suitable materials, or any suitable combination of materials. This includes plastic or metal materials, or combinations thereof. Most preferably, however, the locking device is manufactured from plastic, by, for example, injection molding or the like. Suitable plastics include polyethylene, polypropylene, or the like.

The plastic material selected should also provide suitable properties over a suitable temperature range, such as, for example, −40° C. to +50° C., or the like.

The flexible, resilient connection section is sufficiently rigid so as to assist in minimizing movement of the lug nuts, but is still flexible enough to allow the device installer to flex the device in order to fit over adjacent lug nuts. The openings on the locking device typically include a series of "teeth" which are adapted to fit around and hold against the "shoulders" on the exterior of the lug nuts.

In a further aspect, the present invention also provides a method for reducing the amount of rotational movement of adjacent lug nuts by placing one or more locking devices of the present invention, on a series of at least two adjacent lug nuts, in the manner herein described.

In a still further aspect, the present invention also provides a wheel lug nut locking system comprising placing a plurality of locking devices of the type described herein, around the lug nuts of a wheel assembly.

DETAILED DESCRIPTION OF THE INVENTION

In the present application, the term "wheel lug nut" refers to the nut which is used to hold the wheel in place on a tractor trailer wheel assembly. The present application is therefore primarily directed to the use of the devices on tractor trailer wheel lug nuts. However, the skilled artisan will be aware that lug nuts can be used in a wide variety of application. Accordingly, while the present application is described with particular reference to the tractor trailer industry, the skilled artisan would be aware that the present application is equally applicable in other applications where relative rotational movement of adjacent tightening nuts, is desired.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
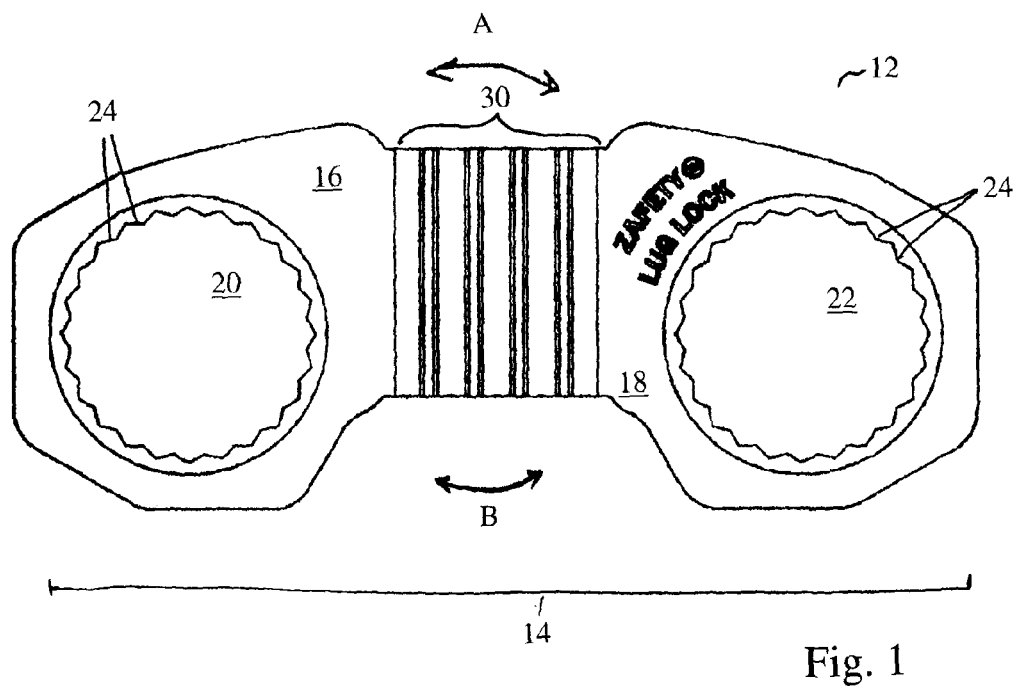
FIG. 1 is a top view of a wheel lug nut locking device is shown, in accordance with the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Further, unless otherwise specifically noted, all of the features described herein may be combined with any of the above aspects, in any combination.

Referring to FIG. 1 an wheel lug nut locking device 12, according to the present invention is shown having a flat member 14 and having a first substantially planar section 16, and a second substantially planar section 18. Each of the first and second planar sections (16, 18) have a opening, 20 and 22, respectively. Around the perimeter of openings 20 and 22, a series of "teeth" 24, are provided to engage the shoulders of a lug nut.

Figure 2:
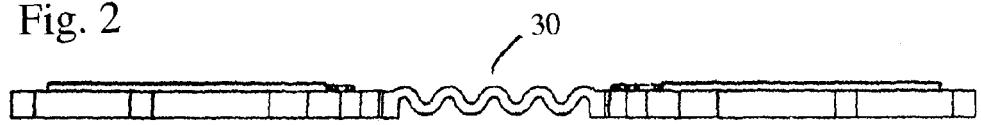
FIG. 2 is a side view of the device shown in FIG. 1.

Planar sections 16 and 18 are separated by a flexible, connection section 30. As best seen in FIG. 2, connection section 30 is made flexible by providing a concertina-like section which permits relative movement of planar sections 16 and 18 in the plane of flat member 14, as indicated by arrows "A" and "B". Movement out of the plane of flat member 14 is also possible and permitted.

Figure 3:
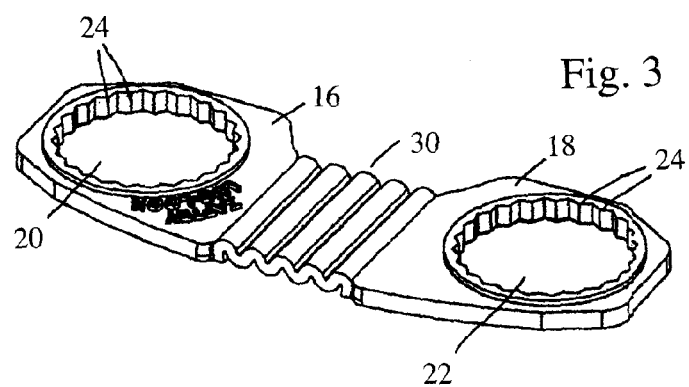
FIG. 3 is a perspective view of the bottom of the device of FIG. 1.

Further details can be seen in FIG. 3.

Figure 4:
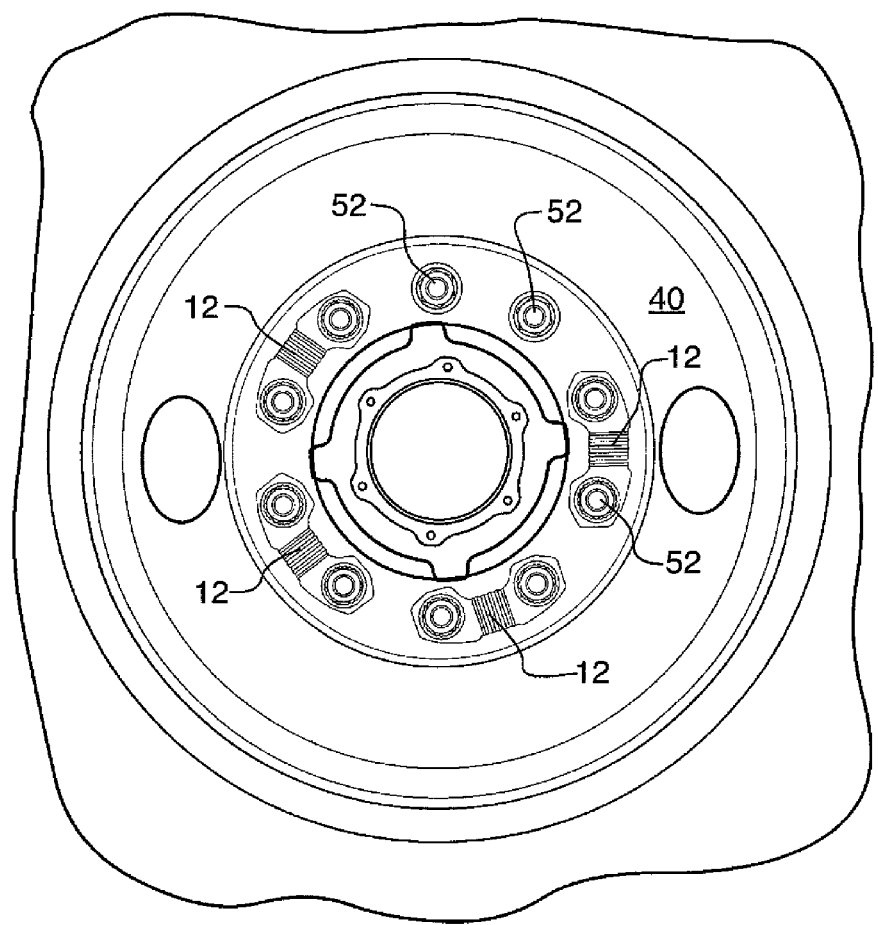
FIG. 4 is a perspective view of a ten lug nut wheel having four of the devices from FIG. 1, installed.

In FIG. 4, a wheel hub 40 is shown having ten lug nuts 52 which are used to hold the wheel hub 40 on a trailer wheel axle assembly in the manner known within the industry. Lug nuts 52 include nut shoulders 54 which are adapted to be engaged by a tightening wrench (not shown), but also by the teeth 24 of openings 22 or 24.

Four locking devices 12, according to the present invention, have been installed on a total of eight lug nuts 52. Each of the eight lug nuts 52 is operatively connected to one adjacent lug nut 52.

To install the locking device 12 of the present invention, it is held over the appropriate lug nuts 52, in a position close to its final position. One opening 22 is fitted over one lug nut 52 and pressed into place so that teeth 24 engage the shoulders of lug nut 52. The resilient nature of the locking device material allows the concertina-like, flexible section 30, to be slightly rotated so that the teeth 24 of opening 24 are aligned with the shoulders of an adjacent lug nut 52. This can be easily accomplished within a few seconds, and all five locking devices 12, can be installed on to wheel hub 40, in a short time period.

In use, any loosening of a wheel lug nut 52 is initially prevented by the resistance to movement by the resilient nature of locking device 12. As such, the amount of rotational movement of the lug nut 52 is minimized. Should the lug nut 52 continue to loosen, it will ultimately deform the shape of concertina-like flexible section 30, so as to be visible by the operator on inspection. Short of a catastrophic failure of flexible section 30, the locking device 12 of the present invention acts to prevent completely loosening of lug nuts 52, even in situations where some minor loosening of a lug nut 52 has occurred. Since the lug nut is prevented from any significant rotation, the likelihood of a total release of lug nut 52 from wheel hub 40 is essentially eliminated.

Figure 5:
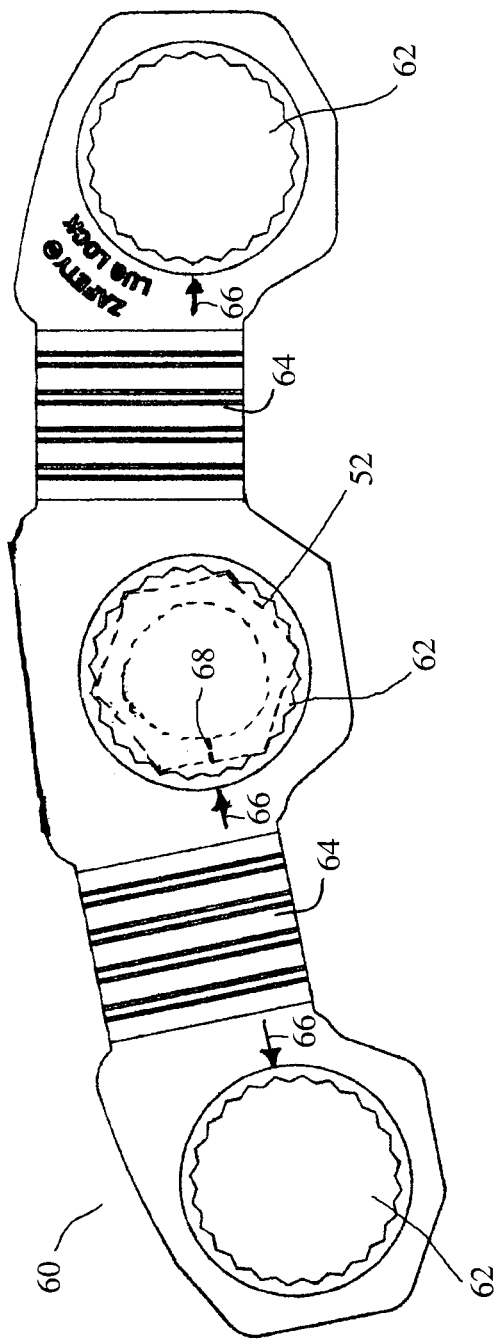
FIG. 5 is a top view of an alternative embodiment, wherein three openings are provided, and the openings include an indicator arrow to show movement.

In FIG. 5, an alternative embodiment of the present invention is provided wherein locking device 60 includes three openings 62, in series, each of which is separated by a flexible section 64. In use, the three openings are placed over three lug nuts, which are positioned in series around a wheel hub (not shown).

Also, adjacent to openings 62 are indicator arrows 66. These can be aligned with a mark made 68 on the lug nut 52 (one shown in outline). This can be used in the unlikely situation wherein movement of the lug nut within opening 62, has occurred.

The number of openings per locking device can vary, as previously described, and preferably, the number of openings in two. Also, preferably only one locking device is fitted to each lug nut. However, where space permits on a lug nut, additional locking devices can be fitted to either reinforce an existing locking device, or to supplement the locking arrangement by locking a particular lug nut to a second adjacent lug nut. In this later option, each single lug nut is fitted to two locking devices; each of which is operatively connected to two different and separate adjacent lug nuts.

The locking devices of the present invention are preferably made of a bright, highly visible plastic material which allows them to be easily seen, even under low lighting conditions. This allows the condition of the wheel lug nuts to be easily and rapidly checked on a regular basis.

Thus, it is apparent that there has been provided, in accordance with the present invention, a lug nut locking device which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A lug nut locking device comprising a member made of plastic having a first planar section at one end of the member, and a second planar section at an opposite end of the member, wherein each of said first and second planar sections has a opening adapted to be friction fitted around a lug nut, and wherein,
    said first and second planar sections are separated by a flexible, resilient connection section which allows relative movement of the first and second planar sections,
    said member is substantially flat to form a plane, and said connection section allows movement of said first and second planar sections within the plane of the member, and wherein said flexible, resilient connection section has a concertina-like structure.

2. A lug nut locking device as claimed in claim 1 wherein said concertina-like structure allows said connection section to be compressed or expanded within the plane of the flat member.

3. A lug nut locking device as claimed in claim 1 wherein said locking member additionally comprises one or a plurality of additional openings in series which are adapted to be fitted to additional lug nuts.

4. A lug nut locking device as claimed in claim 1 wherein said locking device is made from blow-molded plastic.

5. A lug nut locking device as claimed in claim 4 wherein said plastic is a bright, highly visible plastic material.

6. A lug nut locking device as claimed in claim 1 wherein each of said openings comprises a series of teeth which are adapted to be fitted around the shoulders of a lug nut, so as to provide said friction fit.

7. A lug nut locking device as claimed in claim 1 additionally comprising one or more indicator arrows adapted to be aligned with a corresponding mark on a lug nut.

8. A wheel lug nut locking system comprising a plurality of lug nut locking devices, as claimed in claim 1, which have been fitted around the lug nuts of a wheel hub assembly.

9. A wheel lug nut locking system as claimed in claim 8 wherein each lug nut on the wheel hub assembly is fitted with a lug nut locking device.

10. A wheel lug nut locking system as claimed in claim 8 wherein said concertina-like section of each of said lug nut locking devices allows said connection section to be compressed or expanded within the plane of the flat member.

11. A wheel lug nut locking system as claimed in claim 8 wherein each of said lug nut locking devices additionally comprises one or a plurality of additional openings in series which are adapted to be fitted to additional lug nuts.

12. A wheel lug nut locking system as claimed in claim 8 wherein each of said lug nut locking devices is made from a bright, highly visible plastic material.

13. A wheel lug nut locking system as claimed in claim 8 wherein each of said openings of each of said lug nut locking devices comprises a series of teeth which are adapted to be fitted around the shoulders of a lug nut, so as to provide said friction fit.

14. A wheel lug nut locking system as claimed in claim 8 wherein each of said lug nut locking devices additionally comprises one or more indicator arrows adapted to be aligned with a corresponding mark on a lug nut.

15. A lug nut locking device as claimed in claim 1 wherein said lug nut locking device is fitted to a wheel so as to be a wheel lug nut locking device.

* * * * *